Figure 2:
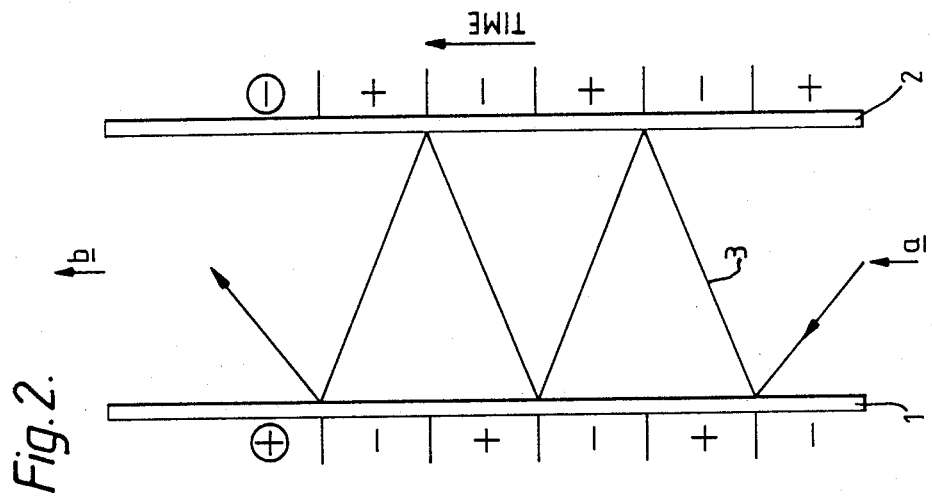

United States Patent [19]
Bridger et al.

[11] Patent Number: 4,790,918
[45] Date of Patent: Dec. 13, 1988

[54] ELECTROCHEMICAL ION EXCHANGE

[75] Inventors: Nevill J. Bridger, Hermitage; Andrew D. Turner, Abingdon, both of England

[73] Assignee: United Kingdom Atomic Energy Authority, London, England

[21] Appl. No.: 25,206

[22] Filed: Mar. 12, 1987

[30] Foreign Application Priority Data

Mar. 12, 1986 [GB] United Kingdom ............... 8606038

[51] Int. Cl.$^4$ ................................. C02F 1/46
[52] U.S. Cl. ................................. 204/149
[58] Field of Search ............... 204/149, 151, 152

[56] References Cited

U.S. PATENT DOCUMENTS

| | | | |
|---|---|---|---|
| 3,533,929 | 10/1970 | Evans | 204/149 |
| 4,596,641 | 6/1986 | Bridger | 204/151 |
| 4,671,863 | 6/1987 | Tejeda | 204/151 |

FOREIGN PATENT DOCUMENTS

| | | | |
|---|---|---|---|
| 22067 | 7/1978 | Japan | 204/149 |
| 161500 | 7/1986 | Japan | 204/149 |

Primary Examiner—T. M. Tufariello
Attorney, Agent, or Firm—Larson and Taylor

[57] ABSTRACT

Ions are electrochemically removed from an aqueous solution by establishing an electrochemical cell wherein the solution, as cell electrolyte, is caused to flow between a working electrode that includes an ion exchange material and a second electrode that optionally includes an ion exchange material. The polarity of the cell is repeatedly reversed so that ions are successively adsorbed and desorbed at the working electrode and optionally also at the second electrode. Thus, an ion for removal such as $Cs^+$ may be selectively removed in the presence of a much larger concentration of a second ion such as $Na^+$.

7 Claims, 1 Drawing Sheet

ELECTROCHEMICAL ION EXCHANGE

This invention relates to the electrochemical removal of ions from aqueous solutions.

Removal of ions from aqueous solution by conventional ion exchange is well-known. It is also known to remove Cs+ ions from an aqueous solution containing a much larger concentration of Na+ ions by conventional ion exchange, e.g. from contaminanted water wherein the Cs+ ions are radioactive ($^{137}$Cs). The ion exchange material cannot, however, be subsequently regenerated and constitutes a substantial disposal problem.

Electrochemical ion exchange, sometimes referred to as electrochemical deionization, is another known method for removing ions from aqueous solutions and is described, for example, in U.K. Pat. No. 1,247,732 (corresponding to U.S. Pat. No. 3,533,929). Also, U.K. Patent Specifications Nos. 2 150 597A and 2 150 598A describe, respectively, modifications in the procedure and working electrode used in electrochemical ion exchange.

In general terms, it involves establishing an electrochemical cell comprising the aqueous solution as electrolyte, a working electrode and a counter electrode, where at least the working electrode incorporates an ion exchange material such as a resin, and applying a D.C. potential to the working electrode. To remove cations from the solution, a cathodic potential is applied to the working electrode, being a cation responsive electrode. A localised change of pH is thereby produced at the electrode due to generation of OH$^-$ ions which in turn produce active sites thereon for adsorption of cations from the aqueous solution. Regeneration of the working electrode is effected by reversal of its polarity which causes the adsorbed cations to be eluted into an aqueous medium. The cell may also be operated in analogous manner where the working electrode is anion responsive to remove anions from an aqueous solution or, where the working electrode is cation responsive and the counter electrode anion responsive, to remove both anions and cations therefrom. A particular advantage of electrochemical ion exchange is that the working electrode can be regenerated without addition of chemical compounds.

If electrochemical ion exchange is used as described above to remove Cs+ ions from a solution containing a much larger proportion of Na+ ions, the latter would quickly saturate the adsorption capacity of the ion exchange material which would accordingly be unable to adsorb the Cs+ ions.

The invention provides a way of carrying out electrochemical ion exchange which ameliorates the above problem. Thus, in the invention, a method for the electrochemical removal of ions from an aqueous solution comprises establishing an electrochemical cell by causing the aqueous solution, as cell electrolyte, to flow in contact with a working electrode that includes an ion exchange material and with a second electrode, optionally including an ion exchange material, and repeatedly reversing the polarity of the cell so that ions from the aqueous solution are successively adsorbed and desorbed in succession at the working electrode during said flow. When the second electrode includes an ion exchange material, said material may be the same as or different from the ion exchange material of the working electrode.

Preferably, the ions are selectively removed from the aqueous solution in the presence of other ions in solution therein.

The cell may operate in a manner analogous to that of the operation of a chromatographic column so that, in the above-mentioned example of a solution containing Cs+ and Na+ ions, the solution emerging from the cell (the eluent solution) contains a smaller ratio of Cs+ to Na+ ions than the solution entering the cell, i.e. Cs+ ions are selectively removed from the aqueous solution as will be illustrated in the examples herein. However, if the direction of flow of the aqueous solution is reversed synchronously with the polarity of the cell, it may be possible for the cell to operate in a manner anologous to a distillation column, i.e. so that low concentration solution emerges at one part of the cell and high concentration solution at another part.

If desired, the ion exchange material may subsequently be regenerated by methods known in the art so that, in the above example, Cs+ ions are eluted into a sufficiently small volume of liquid for ready disposal.

In one way of carrying out the invention, the working electrode includes ion exchange material and the second electrode does not. Ions are therefore adsorbed and desorbed at the working electrode only, upon reversal of cell polarity. In a second way of carrying out the invention, both working and second electrodes include ion exchange material. Thus, ions are adsorbed and desorbed sequentially at each of the electrodes upon reversal of cell polarity.

The invention may be used to remove cations such as Cs+, as already mentioned, and Sr++, in which case the ion exchange material is a cation responsive material. It may also be possible to use the invention to remove anions using an anion responsive material as the ion exchange material.

Examples of ion exchange materials that may be used are zeolites, titanium phosphate, zirconium phosphate, polyantimonic acid and manganese dioxide. Preferably, the material is one capable of being produced in powder form which facilitates incorporation of the material into the electrode. Where the ion for extraction is radioactive, the ion exchange material is preferably inorganic since inorganic materials are less likely to be affected by radiation than organic materials. In practical cases, the choice of ion exchange material is determined by factors such as the above and the material's selectivity for the ion to be removed.

Account may also have to be taken of the following in carrying out the invention: the flow rate of the solution through the cell; the length of time for which an electrode is maintained at a particular polarity, where it should be noted that the length of time for which an electrode is positive need not necessarily be the same as the length of time for which the cell is negative; and the cell engineering.

The invention has application wherever it is desired to remove ions from aqueous solution, for example in the treatment of liquids containing radioactive ions dissolved therein such as in the nuclear industry, and in the non-nuclear industry.

The invention will now be illustrated by the following examples. Reference will be made to the accompanying drawings wherein FIG. 1 is a schematic diagram of an electrochemical cell showing the passage therethrough of an aqueous solution as a function of time when only the working electrode includes ion exchange material; and FIG. 2 is similar to FIG. 1 but shows the passage through the cell when both working and second electrodes include ion exchange material.

EXAMPLE 1

Figure 1:
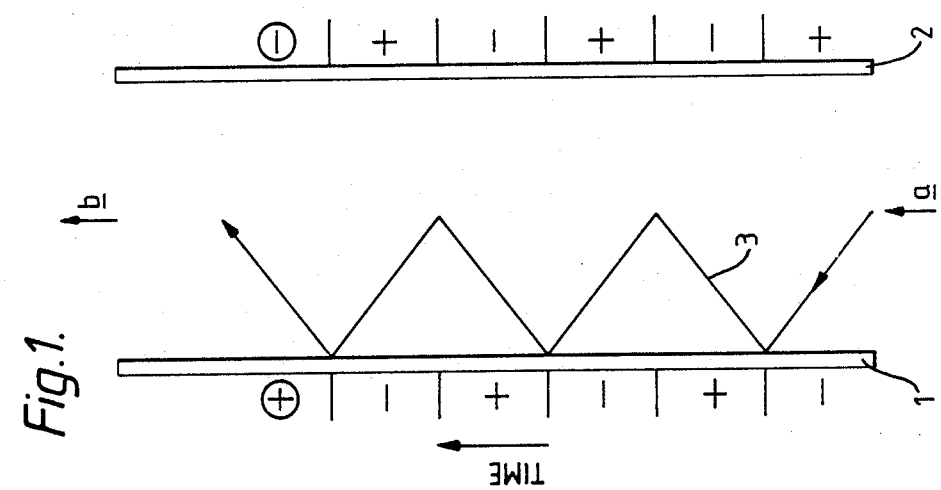

Referring to FIG. 1, an electrochemical cell comprises a working electrode 1 containing a cation responsive ion exchange material (zirconium phosphate) and a second electrode 2 which is inert and acts as a counter electrode. An aqueous feed solution containing $Na^+$ and $Cs^+$ ions, constituting the cell electrolyte, was caused to flow between the electrodes 1 and 2 in the direction shown by the arrow a at a flow rate of 1.8 ml $min^{-1}$. The polarity of the cell was repeatedly alternated by a switching means so that the polarity of each electrode 1 and 2 changed as a function of time as shown by the plus and minus signs adjacent the appropriate electrode 1 or 2. The passage of time is indicated by the arrow marked "time", and time when polarity was changed is indicated by short horizontal lines. The time for which each electrode 1 and 2 was positive was 3 sec and the time for which each electrode 1 and 2 was negative was also 3 sec.

The $Na^+$ and $Cs^+$ ions were successively adsorbed and desorbed at the working electrode 1 as shown by the zig-zag line 3, the arrows thereon indicating movement of the ions. The aqueous solution then left the cell as an effluent solution in the direction shown by the arrow b.

The composition of the feed solution and effluent solution was measured and the results are summarised in the table below where the figures are the concentration of the identified ion in arbitrary units, taking 100 as the concentration of each ion in the feed solution.

|  | $Na^+$ | $Cs^+$ |
| --- | --- | --- |
| FEED | 100 | 100 |
| EFFLUENT | 100 | 50 |

The decontamination factor (DF) for the $Cs^+$, i.e. the ratio of its concentrations before and after the treatment, was therefore 2.

EXAMPLE 2

Referring to FIG. 2, the same reference numerals and letters as in FIG. 1 are used to show similar features. However, the second electrode 2 in FIG. 2 also included cation responsive ion exchange material and is therefore a working electrode also. Thus, when the procedure described in Example 1 was carried out the $Na^+$ and $Cs^+$ ions were adsorbed by the working electrode 1 when it was negative and desorbed by the working electrode 1 when it was positive. Correspondingly, the $Na^+$ and $Cs^+$ ions were adsorbed by the second electrode 2 when it was negative and desorbed by the second electrode 2 when it was positive. The adsorption and desorption of the ions in operation of the cell was therefore as shown by the zig-zag line 3 in FIG. 2.

The flow rate was 1.8 ml $min^{-1}$ (as in Example 1), the time for which each electrode 1 and 2 was positive was 30 sec and the time for which each electrode 1 and 2 was negative was also 30 sec.

The results are summarised in the table below.

|  | $Na^+$ | $Cs^+$ |
| --- | --- | --- |
| FEED | 100 | 100 |
| EFFLUENT | 31.4 | 2.3 |

The decontamination factor is therefore 43.

We claim:

1. A method for the electrochemical removal of ions from an aqueous solution which comprises establishing an electrochemical cell by causing the aqueous solution, as cell electrolyte, to flow in contact with a working electrode that includes anion exchange material and with a second electrode, applying voltages of opposite polarity to each of said electrodes and repeatedly reversing the polarity of said voltages at each electrode while the aqueous solution is in contact with the working electrode so that ions therefrom are adsorbed and desorbed in succession at the working electrode, the rate of flow of the aqueous solution and the rate of reversal of polarity being such that ions from the solution are subjected to a plurality of adsorption/desorption cycles at the working electrode.

2. A method according to claim 1 wherein the ions are selectively removed from the aqueous solution in the presence of other ions in solution therein.

3. A method according to claim 1 wherein the second electrode includes ion exchange material whereby ions from the aqueous solution are adsorbed and desorbed in succession at the second electrode also during said flow, said ion exchange material being the same as or different from the ion exchange material of the working electrode.

4. A method according to claim 1 wherein the ion exchange material is a cation responsive material and the ions for removal are cations.

5. A method according to claim 4 wherein the ions for removal are caesium ions or strontium ions.

6. A method according to claim 4 wherein the cations for removal are radioactive and the ion exchange material is inorganic.

7. A method according to claim 1 wherein the ion exchange material is subsequently regenerated thereby to elute ions for removal into an elution solution.

* * * * *